United States Patent [19]

Schmitt

[11] Patent Number: 4,688,019
[45] Date of Patent: Aug. 18, 1987

[54] SIGNAL TRANSMISSION SYSTEM

[75] Inventor: Walter Schmitt, Traunreut, Fed. Rep. of Germany

[73] Assignee: Johannes Heidenhain GmbH, Traunreut, Fed. Rep. of Germany

[21] Appl. No.: 658,112

[22] Filed: Oct. 5, 1984

[30] Foreign Application Priority Data

Oct. 17, 1983 [DE] Fed. Rep. of Germany ....... 3337653

[51] Int. Cl.⁴ .............................................. G08C 9/06
[52] U.S. Cl. ........................... 340/347 P; 250/231 SE; 250/237 G; 377/3
[58] Field of Search ............... 340/347 P; 250/237 G, 250/231 SE; 364/562; 370/112; 381/7; 377/3

[56] References Cited

U.S. PATENT DOCUMENTS

| 2,986,726 | 5/1961 | Jones | 340/347 P |
| 3,534,360 | 10/1970 | Hafle | 340/347 P |
| 3,601,634 | 8/1971 | Ebertin | 370/112 |
| 4,101,764 | 7/1978 | Nelle | 377/3 X |
| 4,229,647 | 10/1980 | Burkhardt | 377/3 |
| 4,306,220 | 12/1981 | Schwefel et al. | 377/3 X |
| 4,342,025 | 7/1982 | Spälti et al. | 250/231 SE X |
| 4,418,348 | 11/1983 | Tanaka et al. | 340/347 P |
| 4,465,928 | 8/1984 | Breslow | 250/231 SE |
| 4,491,928 | 1/1985 | Reichl | 364/562 |
| 4,524,347 | 6/1985 | Rogers | 340/347 P |
| 4,600,835 | 7/1986 | Ishida et al. | 250/231 SE |

FOREIGN PATENT DOCUMENTS 2850555 11/1979 Fed. Rep. of Germany .......... 381/7
3039483 10/1980 Fed. Rep. of Germany .

Primary Examiner—William M. Shoop, Jr.
Assistant Examiner—Sharon D. Logan
Attorney, Agent, or Firm—Willian Brinks Olds Hofer Gilson & Lione Ltd.

[57] ABSTRACT

In a measuring instrument for measuring the relative position of two objects, the graduation of a scale as well as a number of identical reference marks absolutely positioned with respect to this graduation and associated code marks are scanned by a scanning unit. The periodic scanning signals obtained in the scanning of this graduation are transferred via first signal lines, and the reference signals obtained in the scanning of the reference marks are transferred over a second signal line to an evaluating arrangement. Code signals obtained in the scanning of the associated code marks by the scanning unit are also transmitted over the second signal line to the evaluating arrangement. The reference signals and the code signals on the second signal line are distinguished from one another by means of AND gates which ensure that the reference signals and the code signals are present on the second signal line only during respective predetermined signal states of the periodic scanning signals.

7 Claims, 4 Drawing Figures

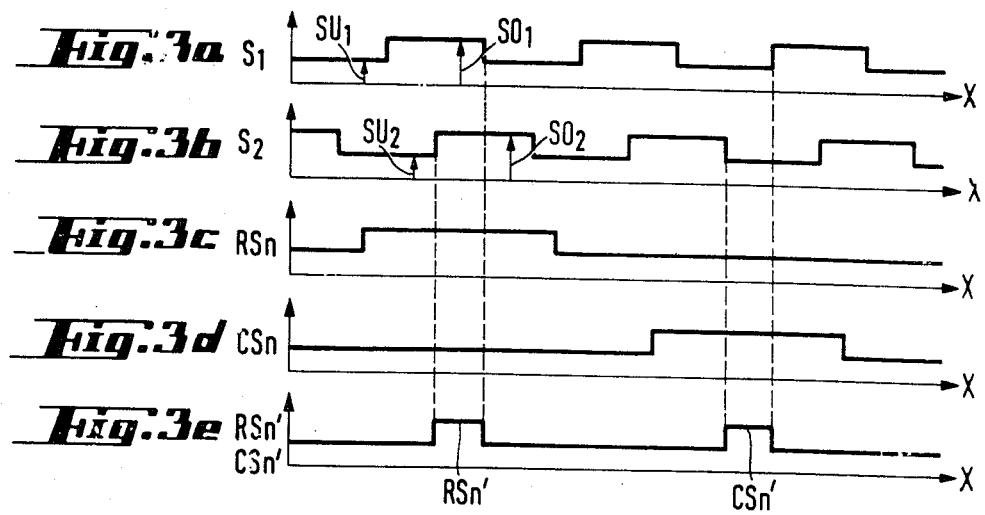
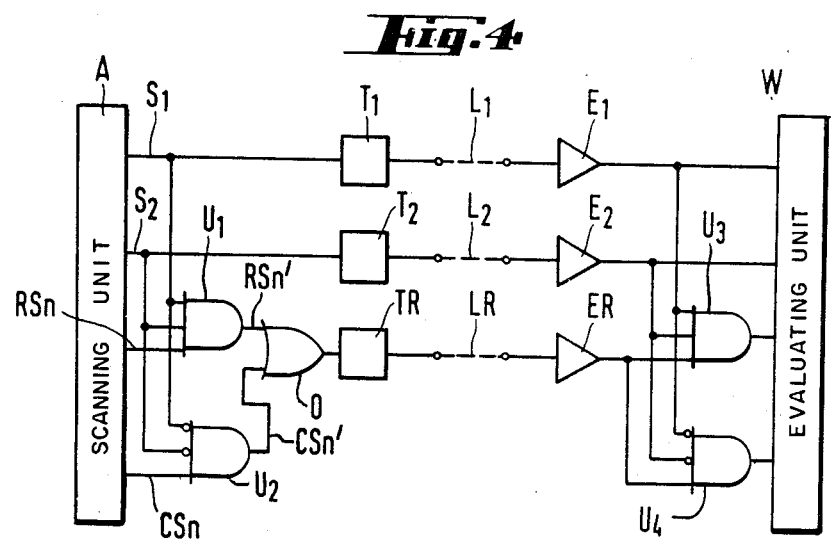

SIGNAL TRANSMISSION SYSTEM

BACKGROUND OF THE INVENTION

The present invention relates to a method and apparatus for transmitting signals in an instrument such as a length or angle measuring instrument of the type comprising a first signal line on which a periodic signal with first and second signal states is transmitted, a second signal line, and means for generating first and second nonperiodic signals.

German DE-OS 30 39 483 discloses a known incremental measuring system which includes a scale that defines a graduation and a plurality of identical reference marks absolutely positioned with respect to the graduation. Respective code marks are allocated to each of the reference marks for identification purposes. The graduation, the reference marks, and the associated code marks of the measuring scale are scanned by means of associated scanning fields of a scanning unit included in the measuring instrument. The scanning unit generates two periodic scanning signals as the scanning unit moves along the graduation of the scale. In order to allow discrimination of the measuring direction, these two periodic scanning signals are phase shifted with respect to one another through 90° (a quarter of the graduation period of the graduation). The two scanning signals are applied via two respective scanning signal lines to an evaluating arrangement for the determination of the relative position of the scanning unit with respect to the scale. In addition, the scanning unit generates a reference signal during scanning of the reference marks, and these reference signals are applied via a reference signal line to the evaluating arrangement. Similarly, the scanning unit generates code signals in response to scanning of the code marks, and the code signals are applied via a code signal line to the evaluating arrangement. In such a measuring arrangement, the electrical reference signals generated in response to the reference marks can be used in various ways in the evaluating arrangement. For example, they can be used to reproduce the zero position of a counter including in the evaluating arrangement, or for loading a predetermined position value into the counter at the beginning of the measurement operation, or for control or checking of interference pulses. In addition, such reference signals can be used to control external arrangements coupled on the outlet side of the evaluating arrangement.

SUMMARY OF THE INVENTION

The present invention is directed to an improved signal transmission system of the general type described in the opening paragraph of this application, which reduces the total required number of signal transfer lines.

According to this invention, an instrument of the type described initially above is utilized by gating the first nonperiodic signal onto the second signal line when the periodic signal is in the first signal state, and by gating the second nonperiodic signal onto the second signal line when the periodic signal is in the second signal state. In this way, both the first and second nonperiodic signals are transmitted on the same signal line.

The present invention provides important advantages in terms of a reduction of the required number of signal lines. Because a single signal line is used to transfer multiple signals, the total number of signal lines can be reduced. Particularly in the case of long signal lines, this results in a cost reduction and a simplification of the system as well as in simplified assembly. Further advantageous features of the invention are set forth in the dependent claims.

The invention itself, together with further objects and attendant advantages, will best be understood by reference to the following detailed description, taken in conjunction with the accompanying drawings.

BRIEF DESCRIPTION OF THE DRAWINGS

FIG. 3 is a wave form diagram of various signals generated by the measuring instrument of FIG. 1.

FIG. 4 is a schematic circuit diagram of a portion of the signal transmission circuitry included in the measuring instrument of FIG. 1.

DETAILED DESCRIPTION OF THE PRESENTLY PREFERRED EMBODIMENTS

Figure 1:
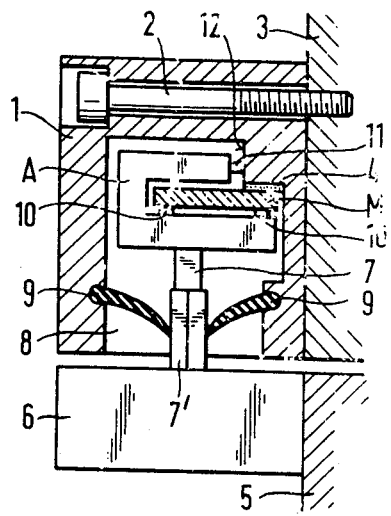
FIG. 1 is a cross-sectional view of an incremental encapsulated measuring instrument which incorporates a presently preferred embodiment of this invention.

Turning now to the drawings, FIG. 1 shows a cross-sectional view of an encapsulated, incremental length measuring instrument which includes a housing 1 in the form of a hollow profile. This housing 1 is fastened by means of fasteners 2 to an object 3, the position of which is to be measured. For example, the object 3 may take the form of a slidepiece of a processing machine (not shown). A scale M is fastened to an interior surface of the housing 1 by means of an elastic adhesive layer. The scale M is scanned by a scanning unit A which is mounted within the housing 1. A second object 5 to be measured relative to the first object 3 may take the form of a bed of the processing machine. A mounting foot 6 is fastened to this second object 5 in any suitable manner, and the mounting foot 6 is connected via a follower 7 with a scanning unit A. The housing 1 defines a slit 8 running in the longitudinal direction, and this slit 8 is closed by a pair of opposed sealing lips 9. The follower 7 defines a region 7' of sword-shaped cross-section which extends between the sealing lips 9. The scanning unit A is guided by means of rollers 10 which track on guide surfaces defined by the scale M as well as by means of rollers 11 which track on guide surfaces 12 defined by the housing 1.

Figures 2A, 2B:
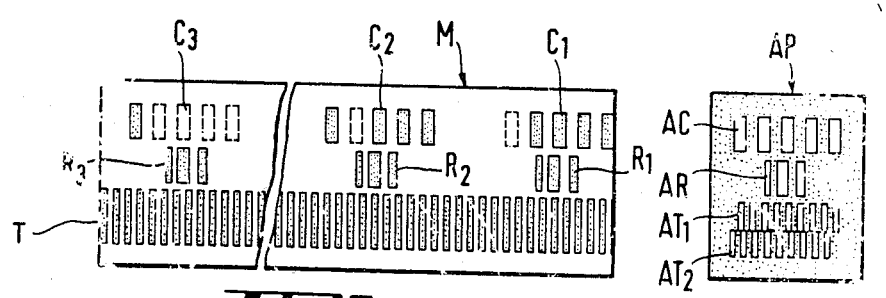
FIG. 2 is a plan view of the scale and the scanning plate of the measuring instrument of FIG. 1.

As shown in FIG. 2, the scale M includes an incremental graduation T which takes the form of a line grid which is scanned by the scanning unit A. Alongside the graduation T there is provided on the scale M a series of identical reference marks R (n=1, 2, 3). Each of the reference marks $R_n$ is absolutely positioned on the scale M with respect to the graduation T. For the identification of the reference marks $R_n$ there is provided in each case a respective code mark $C_n$. The code marks $C_n$ differ one from another in order to provide positive identification for the associated reference marks $R_n$. The scanning unit A includes a scanning plate AP for scanning of the graduation T of the scale M. This scanning plate AP includes two scanning fields $AT_1$, $AT_2$ which are offset with respect to one another by a quarter of the grid constant (graduation period) of the graduation T. The graduations of the scanning fields $AT_1$, $AT_2$ are identical with the graduation T. The scanning plate AP also includes a scanning field AR for the scanning of the reference marks $R_n$, as well as a scanning field AC for the scanning of the code marks $C_n$. A respective photosensor (not shown) is included in the scanning unit A for each of the scanning fields $AT_1$, $AT_2$, AR, AC. The photosensors associated with the scanning fields $AT_1$, $AT_2$ generate two respective periodic scanning signals which are phase shifted with respect to one another by a quarter of the grid constant (graduation period) of the graduation T. These periodic scanning signals are amplified in the scanning unit A (in a manner not shown) and are transformed into periodic square wave scanning signals $S_1$, $S_2$ as shown in FIGS. 3a and 3b. As pointed out above, the phase shift of 90° between the two periodic scanning signals $S_1$, $S_2$ permits the scanning direction to be determined.

The photosensor associated with the scanning field AR generates a nonperiodic reference impulse at the instant of scanning of the reference mark $R_n$, and the photosensor associated with the scanning field AC generates a nonperiodic code impulse at the scanning of the associated code mark $C_n$. The reference impulse and the code impulse are amplified in the scanning unit A and are transformed into associated square wave reference signals $RS_n$ and code signals $CS_n$ (FIGS. 3c, 3d, respectively). In FIG. 3 the scanning signals $S_1$, $S_2$ and the signals $RS_n$, $CS_n$ are shown as a function of the relative position X of the two objects 3,5 to be measured.

The reference signals $RS_n$ obtained as described above can be used to trigger various functions. For example, by evaluating the reference signals $RS_n$, an incremental measuring instrument can be made to operate as a quasi-absolute measuring instrument if a number is associated with each reference mark $R_n$ which represents its absolute position with respect to an invariable zero point. In addition, preselected ones of the reference marks $R_n$ can be used to set the counter of the measuring instrument to the value zero in response to the reference signal $RS_n$ obtained from the selected reference mark $R_n$.

As shown in FIG. 4, the periodic scanning signals $S_1$, $S_2$ from the scanning unit A are transmitted via respective signal lines $L_1$, $L_2$ to an evaluating arrangement W for determination of the relative position of the objects 3,5 to be measured. The signal lines $L_1$, $L_2$ are coupled, particularly in the case of relatively great lengths, to respective line drivers $T_1$, $T_2$, as well as to respective line receivers $E_1$, $E_2$. Similarly, the reference signals $RS_n$ generated by the scanning unit A are transmitted to the evaluating arrangement W via a signal line LR which similarly is coupled to a line driver TR and a line receiver ER. The line drivers $T_1$, $T_2$, TR and the line receivers $E_1$, $E_2$, ER operate to preserve signal quality in transmission as well as to reduce sensitivity to interference.

According to this invention, in this embodiment the code signals $CS_n$ generated by the scanning unit A are transmitted to the evaluating arrangement W not via a separate signal line, but via the same signal line LR used to transmit the reference signals $RS_n$. In order to allow discrimination between the reference signals $RS_n$ and the code signals $CS_n$, the code signals $CS_n$ are applied to the signal line LR when the scanning signals $S_1$, $S_2$ are in the lower signal states $SU_1$, $SU_2$, and the reference signals $RS_n$ are applied to the signal line LR when the scanning signals $S_1$, $S_2$ are in the upper signal states $SO_1$, $SO_2$. In this example the upper signal states or signal level $SO_1$, $SO_2$ corresponds to a logical 1 and the lower signal state or signal level $SU_1$, $SU_2$ corresponds to a logical zero of the periodic square wave scanning signals $S_1$, $S_2$.

In this preferred embodiment, this is accomplished by a circuit at the outlet side of the scanning unit A which includes two AND gates $U_1$, $U_2$. The first inputs of the two AND gates $U_1$, $U_2$ are connected with the signal line $L_1$ and the second inputs of the two AND gates $U_1$, $U_2$ are connected with the signal line $L_2$. The reference signals $RS_n$ are applied to the third input of the AND gate $U_1$ and the code signals $CS_n$ are applied to the third input of the AND gate $U_2$. The first and second inputs of the AND gate $U_2$ are inverting inputs. If the reference signal $R_n$ and the upper signal states $SO_1$, $SO_2$ of the two scanning signals $S_1$, $S_2$ are applied simultaneously to the inputs of the AND gate $U_1$, a reference signal $RS_n'$ appears on the output of the AND gate $U_1$ with a pulse length of a quarter of the grid constant of the graduation T (FIG. 3e). Because of its two inverting inputs, the AND gate $U_2$ generates an output in the logical low state during times when the upper signal states $SO_1$, $SO_2$ of the scanning signals $S_1$, $S_2$ are present. Similarly, if the code signal $CS_n$ and the lower signal states $SU_1$, $SU_2$ of the two scanning signals $S_1$, $S_2$ are applied simultaneously to the inputs of the AND gate $U_2$, the output of the AND gate $U_2$ corresponds to a code signal $CS_n'$ having a pulse length of a quarter of the grid constant of the graduation T (FIG. 3e). The AND gate $U_1$ generates an output in the logic low level during these lower signal states $SU_1$, $SU_2$.

The output signals $RS_n'$, $CS_n'$ of the AND gates $U_1$, $U_2$ are applied to an OR gate O and via the OR gate O to the line driver TR and the receiver ER of the line LR. The output of the receiver ER is applied to a third input of two separate AND gates $U_3$, $U_4$. The first input of the two AND gates $U_3$, $U_4$ is connected in each case with the signal line $L_1$, and the second input of the two AND gates $U_3$, $U_4$ is connected in each case with the signal line $L_2$. The first and second inputs of the AND gate $U_4$ are inverting inputs. If the code signals $CS_n'$ and the lower signal states $SU_1$, $SU_2$ of the scanning signals $S_1$, $S_2$ are simultaneously applied to the inputs of the AND gate $U_4$, the code impulse $CS_n'$ is gated by the AND gate $U_4$ and is applied to a code pulse input of the evaluating arrangement W. The AND gate $U_3$ generates an output in the logic low level during these signal states $SU_1$, $SU_2$. If the reference impulse $RS_n'$ and the upper signal states $SO_1$, $SO_2$ of the two scanning signals $S_1$, $S_2$ are simultaneously applied to the inputs of the AND gate $U_3$, the reference signal $RS_n'$ is passed by the AND gate $U_3$ to a reference signal input of the evaluating arrangement W. The AND gate $U_4$ generates an output in the logic low level during the signal states $SO_1$, $SO_2$.

In an alternate embodiment, the two AND gates $U_1$, $U_2$ can be eliminated if the pulse length of the reference signal $RS_n$ and of the code signal $CS_n$ lies within the range of the associated signal states $SO_1$, $SO_2$, $SU_1$, $SU_2$ of the periodic scanning signals $S_1$, $S_2$. The reference signal $RS_n$ and the code signal $CS_n$ in this case are supplied directly to the inputs of the OR gate O.

In a manner not shown in the drawings, the reference signals $RS_n$ can be transmitted on a signal line for the code signals $CS_n$ so that the signal line LR for the reference signals $RS_n$ can be eliminated. The reference signals $RS_n$ can, for example, be associated with the upper signal state $SO_1$ of the scanning signal $S_1$ and the lower signal state $SU_2$ of the scanning signal $S_2$, and the code signals $CS_n$ can be allocated to the lower signal state $SU_1$ of the scanning signal $S_1$ and to the upper signal state $SO_2$ of the scanning signal $S_2$.

If, in such a measuring instrument, no code marks $C_n$ are associated with the reference marks $R_n$, but the identification of individual identical reference marks $R_n$ occurs through evaluation of the different spacings between the individual reference marks $R_n$, then additional signal pulses can be transmitted instead of the code signals $CS_n$. For example, arbitrary monitoring pulses for the reference signals $RS_n$ can be transmitted on the line LR.

Of course, it should be understood that a wide range of changes and modifications can be made to the preferred embodiments described above. For example, the invention is not limited to use with measuring systems, but can also be used in a variety of instruments including signal lines. It is therefore intended that the foregoing detailed description be regarded as illustrative rather than limiting, and that it be understood that it is the following claims, including all equivalents, which are intended to define the scope of this invention.

I claim:

1. A method for transmitting signals in an instrument of the type comprising at least a first signal line on which a periodic signal with first and second signal states is transmitted, at least a second signal line, and means for generating at least first and second nonperiodic signals, said method comprising the following steps:

transmitting the first nonperiodic signal via the second signal line when the periodic signal is in the first signal state; and transmitting the second nonperiodic signal via the second signal line when the periodic signal is in the second signal state;

thereby transmitting both the first and second nonperiodic signals on the second signal line.

2. The invention of claim 1 wherein the second nonperiodic signal comprises a monitoring signal.

3. A measuring instrument of the type comprising means for generating at least a periodic signal on at least a first signal line, said periodic signal having first and second signal states; at least a second signal line; and means for generating at least first and second nonperiodic signals; the improvement comprising:

first means for gating the first nonperiodic signal onto the second signal line when the periodic signal is in the first signal state; and second means for gating the second nonperiodic signal onto the second signal line when the periodic signal is in the second signal state;

said first and second means cooperating to transmit both the first and second nonperiodic signals on the second signal line.

4. The improvement of claim 7 further comprising:

a third AND gate having a first noninverting input coupled to the first signal line and a second noninverting input coupled to the second signal line; and a fourth AND gate having a first inverting input coupled to the first signal line and a second noninverting input coupled to the second signal line.

5. The improvement of Claim 4 further comprising an evaluating unit coupled to respond to the periodic signal on the first signal line and to output signals generated by the third and fourth AND gates.

6. A method for transmitting signals in a length or angle measuring instrument, the instrument comprising a measuring graduation, a plurality of identical reference marks associated with the graduation, a plurality of code marks associated with the reference marks, a scanning unit, at least a first signal line on which a periodic signal with first and second signal states is transmitted, the periodic signal generated by the scanning unit in response to scanning of the graduation, at least a second signal line, at least first and second nonperiodic signals, the first nonperiodic signal generated by the scanning unit in response to scanning of the reference marks, the second nonperiodic signal generated by the scanning unit in response to scanning of the code marks, said method comprising the following steps:

transmitting the first nonperiodic signal via the second signal line when the periodic signal is in the first signal state; and transmitting the second nonperiodic signal via the second signal line when the periodic signal is in the second signal state;

thereby transmitting both the first and second nonperiodic signals on the second signal line.

7. In a measuring instrument of the type comprising means for generating a periodic signal on a first signal line, said periodic signal having first and second signal states; a second signal line; and means for generating first and second nonperiodic signals; the improvement comprising:

first means for gating the first nonperiodic signal onto the second signal line when the periodic signal is in the first signal state, the first means comprising a first AND gate having a first noninverting input connected to the first signal line, a second noninverting input coupled to receive the first nonperiodic signal, and an output;

second means for gating the second nonperiodic signal onto the second signal line when the periodic signal is in the second signal state, the second means comprising a second AND gate having a first inverting input connected to the first signal line, a second noninverting input coupled to receive the second nonperiodic signal, and an output; and an OR gate having first and second inputs coupled to the outputs of the first and second AND gates, respectively, and an output coupled to the second signal line;

said first and second means cooperating to transmit both the first and second nonperiodic signals on the second signal line.

* * * * *

UNITED STATES PATENT AND TRADEMARK OFFICE
CERTIFICATE OF CORRECTION

PATENT NO. : 4,688,019

DATED : August 18, 1987

INVENTOR(S) : Walter Schmitt

It is certified that error appears in the above-identified patent and that said Letters Patent is hereby corrected as shown below:

On the title page Item (73)

Please change the name of the Assignee from "Johannes Heidenhain GmbH" to --Dr. Johannes Heidenhain GmbH--

Signed and Sealed this

Twenty-seventh Day of September, 1988

Attest:

DONALD J. QUIGG

*Attesting Officer*  *Commissioner of Patents and Trademarks*